United States Patent [19]

Corompt

[11] 3,892,323
[45] July 1, 1975

[54] CONTAINER-HANDLING DEVICE FOR A SELF-LOADING VEHICLE

[75] Inventor: Antoine Corompt, Saint-Etienne, France

[73] Assignee: Bennes Marrel, Saint-Etienne (Loire), France

[22] Filed: Apr. 24, 1974

[21] Appl. No.: 463,621

[52] U.S. Cl. .................. 214/505; 214/77 R; 214/84; 214/515
[51] Int. Cl. .............................................. B60p 1/28
[58] Field of Search ............ 214/505, 506, 84, 515, 214/516, 77 R

[56] References Cited
UNITED STATES PATENTS

| | | | |
|---|---|---|---|
| 2,308,648 | 1/1943 | DeVry et al. | 214/146.5 |
| 3,067,966 | 12/1962 | Hicks | 254/166 X |
| 3,819,075 | 6/1974 | Derain | 214/505 |

*Primary Examiner*—Leo Friaglia
*Attorney, Agent, or Firm*—Sughrue, Rothwell, Mion, Zinn & Macpeak; Robert V. Sloan

[57] ABSTRACT

The device comprises a tiltable connecting frame articulated about a first transverse axis at the rear part of the vehicle chassis and slidably supporting an L-shaped member which in turn supports the container to be loaded or unloaded by the device. The tiltable connecting frame is also articulated about a second transverse axis. The connecting frame and L-shaped member are each selectively moved by means of respective jacks. Rotation of the entire connecting frame and L-shaped member as a unit about said first axis provides a dumping action for unloading only the contents of the container while sliding actuation of the L-shaped member followed by rotation of the articulated portion of the connecting frame about the second axis serves to load or unload the container. The container has, below its floor, a pair of spaced longitudinal beams for respective guiding engagement with rollers carried by each of a pair of tiltable bogies located one on each side of the rear part of the vehicle chassis.

4 Claims, 10 Drawing Figures

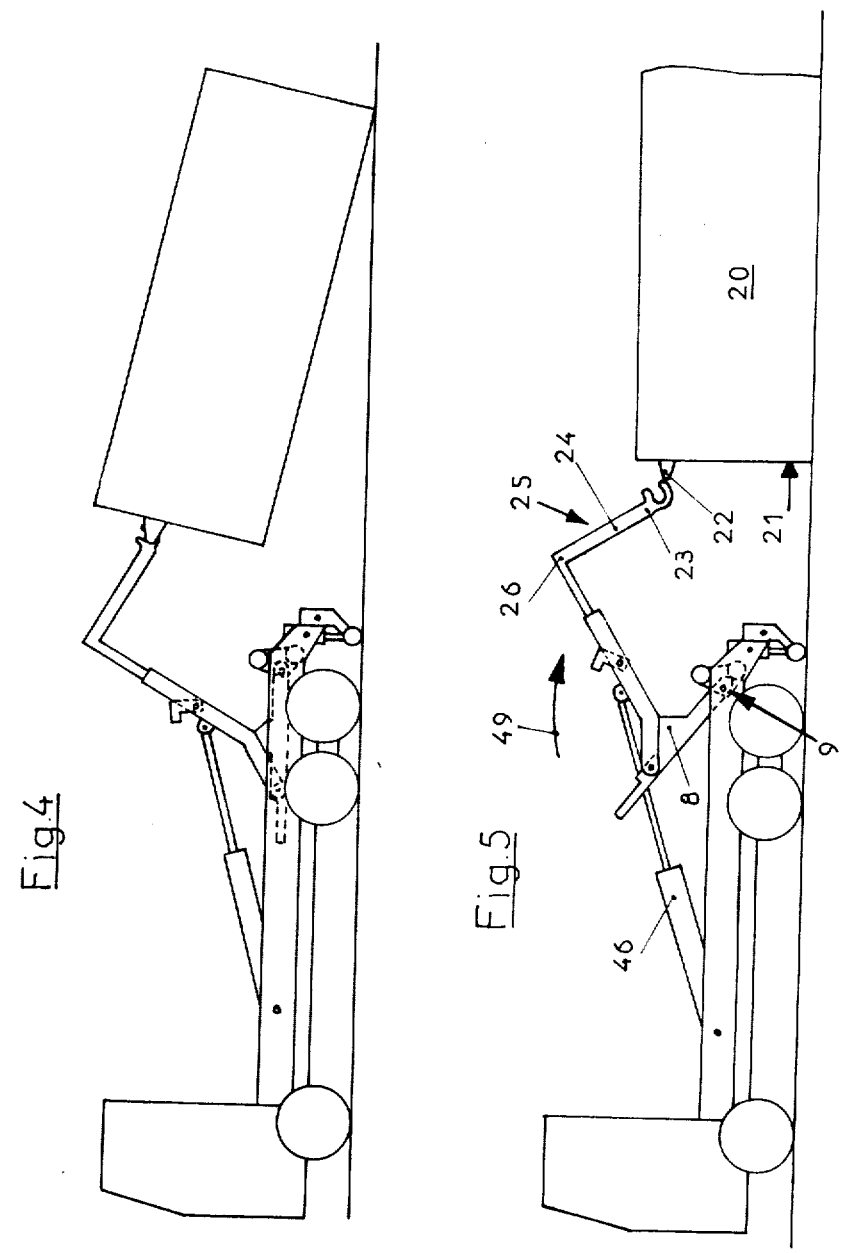

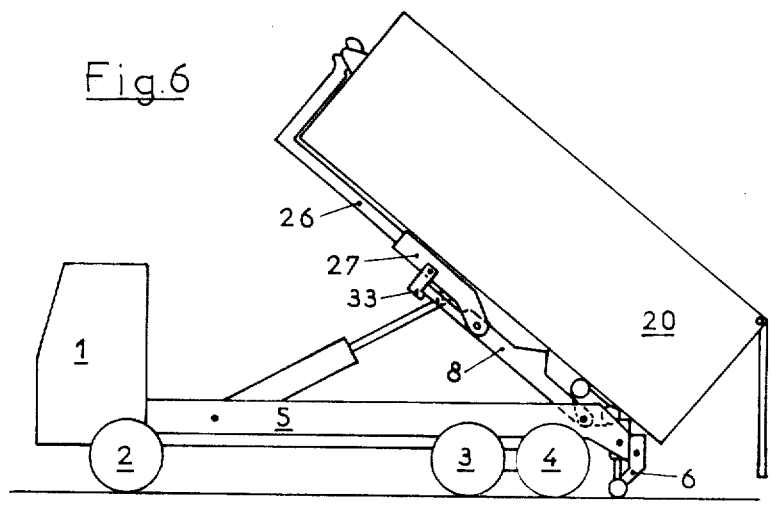
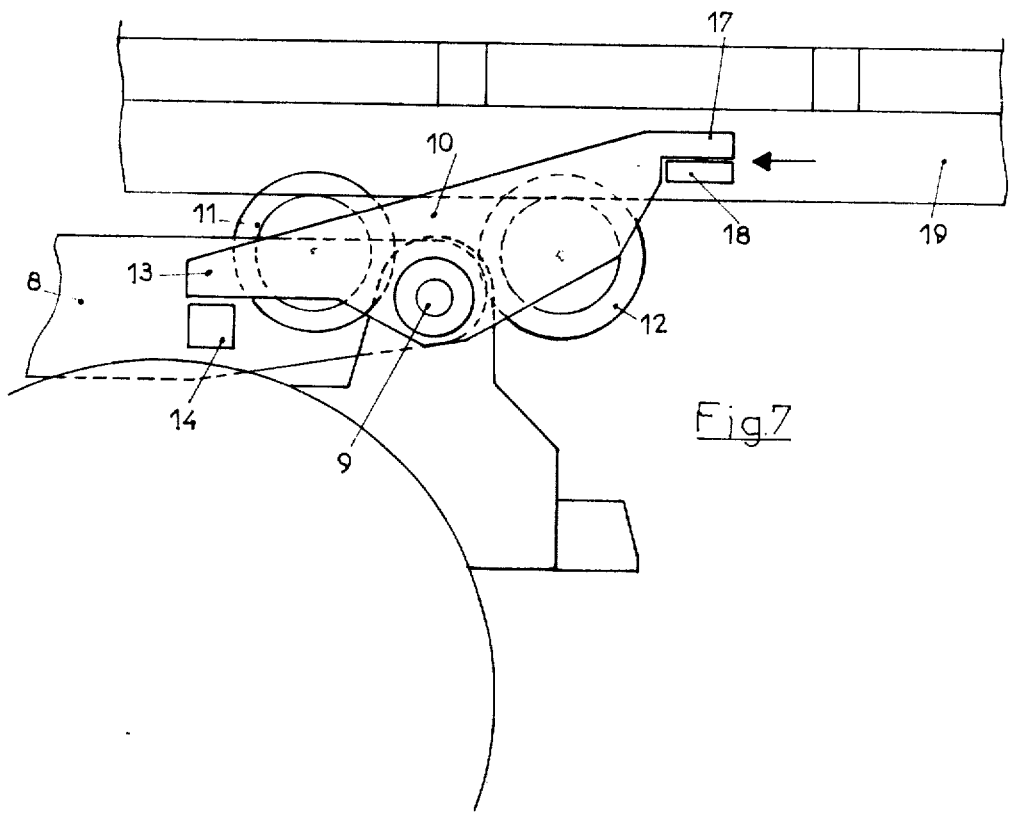

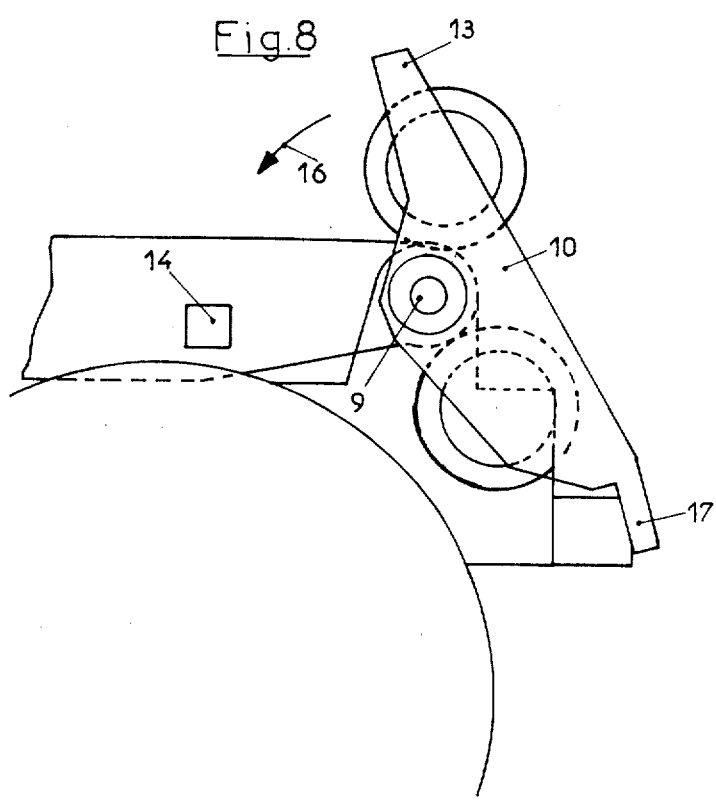

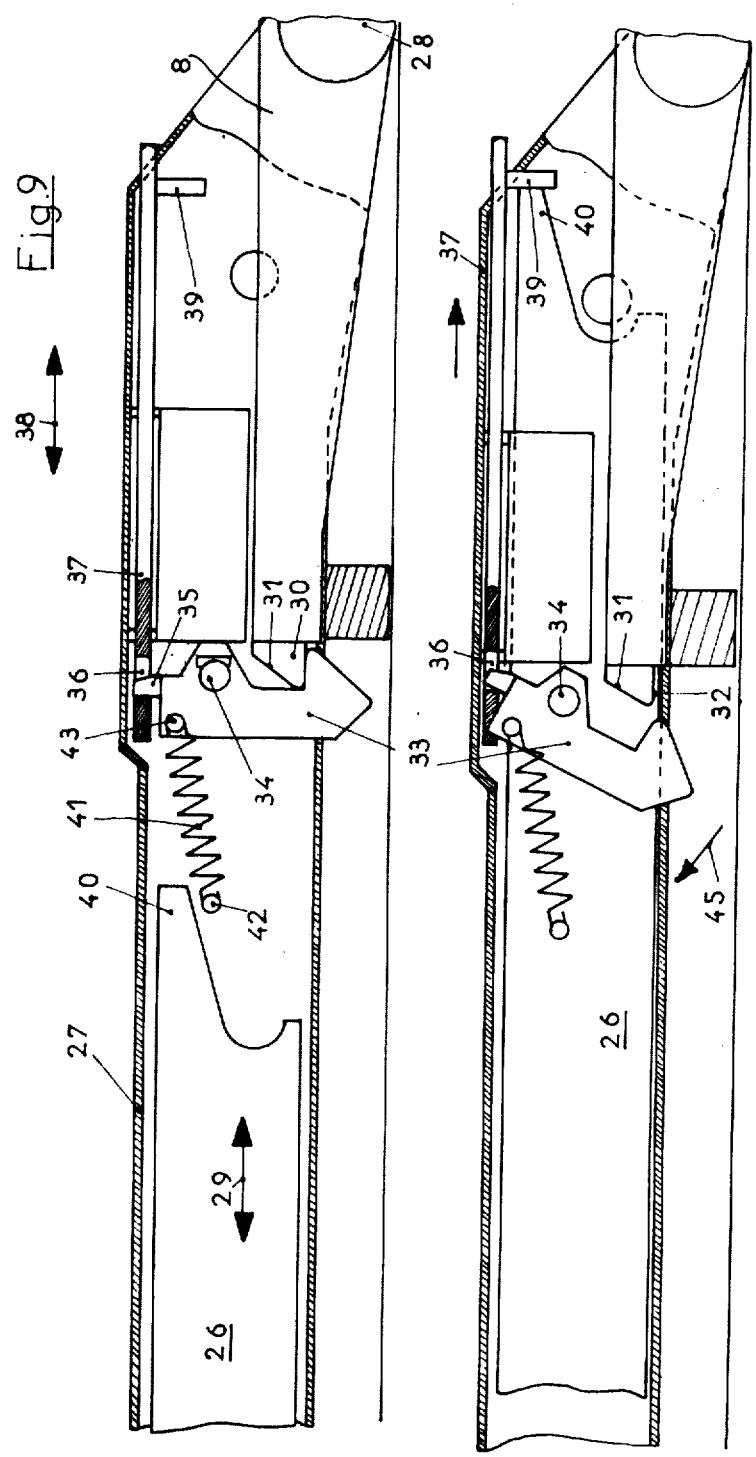

CONTAINER-HANDLING DEVICE FOR A SELF-LOADING VEHICLE

The present invention relates to a container-handling device for a self-loading vehicle, specially for a truck.

In a system of known type, the front end of the container has a loop member adapted to receive a hook of the handling device; said handling device is mounted on the truck and it comprises:
- a L-shaped bracket having two perpendicular arms, namely one upper arm the free end of which is provided with said container handling hook, and a lower arm adapted to slide inside a tiltable sleeve;
- a tiltable sleeve mounted longitudinally on the truck, with its rear end pivoted on the front end of a tiltable connecting frame;
- a tiltable connecting frame the rear end of which is pivoted to the rear part of the vehicle chassis;
- hydraulic rams for sliding said L-shaped bracket in said tiltable sleeve and for pivoting said tiltable sleeve with respect to the vehicle chassis.

This known system is adequate for handling containers of a special type, in particular having specially reinforced lower longitudinal beams and a special lock transverse beam. However, it would be inadequate for handling standard type containers, the lower longitudinal beams of which would be damaged due to excessive local bending strains.

The present invention aims to obviate such drawbacks by providing a container handling device specially adapted to a self-loading truck for handling standard type containers.

A container handling device according to the invention is mounted on the chassis frame of a vehicle for handling a container the front end of which has a hooking loop member while the bottom of which has at least two lower longitudinal beams, it is of the above-mentioned type, and it is characterized in that the rear part of the vehicle chassis has at least two tiltable bogies each of them provided with at least two rollers so that each container longitudinal beam rolls on the rollers of its own boggie during loading or unloading operations, whilst on said tiltable sliding sleeve is pivoted a locking hook adapted to engage a nose member at the front end of said tiltable connecting frame in order to keep said tiltable sleeve in line with said tiltable connecting frame when said container is used as a dumping bucket on said vehicle, means being provided for automatically disengaging said locking hook when said lower arm is beginning to slide into said tiltable sleeve for initiating an unloading operation.

According to a further feature of the invention, each tiltable boggie has on both sides of its transverse pivot pin, respectively: a front nose portion adapted to thrust a stop member of the tiltable connecting frame when a container is carried on the vehicle in loaded position; and a rear nose portion adapted to engage a latching bracket fixed to the corresponding container longitudinal beam.

According to a further feature of the invention, the means for automatically disengaging the sleeve and frame locking hook comprise: an upper lug integral with said locking hook; a pivot pin for said locking hook, located between its upper lug and its lower hooking end; a longitudinally sliding plate guided inside the tiltable sleeve and having, near its front end an opening engaged on said upper lug of said locking hook, and at its rear end a thrust bracket adapted to be engaged by the rear end of said lower arm of the L-shaped bracket so that when the latter is performing the last part of its contraction movement inside said tiltable sleeve, said sliding plate is moved rearwardly together with said hook upper lug thus tilting said hook out of engagement with said connecting frame front nose.

The accompanying drawing, which is given by way of example, will enable the features of the invention to be more clearly understood.

FIG. 1 to 5 illustrate the successive phases of a container unloading operation.

FIG. 6 shows the device when the container is used as a dumping bucket.

FIG. 7 illustrates the locking position of one of the rear bogies.

FIG. 8 shows the same bogie at rest.

FIG. 9 and 10 are longitudinal sections of the tiltable sleeve and connecting frame mechanism, showing the locking hook, respectively in locked and unlocked position.

Figure 1:
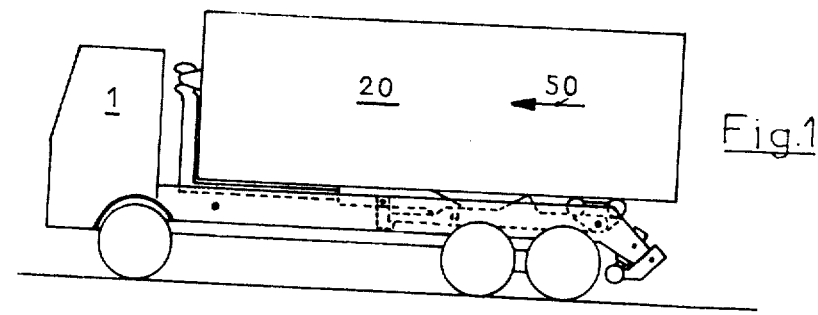

The truck shown in the drawings has a cabin 1, a front wheel axle 2, two rear wheel axles 3 and 4, and a chassis 5. The rear portion of the chassis 5 is provided with a foldable stabilizer 6 the lower end of which has a roller 7 adapted to roll on the ground.

A tiltable connecting frame 8 is pivoted to the rear part of the chassis 5 by means of a pivot pin 9. On said pivot pin 9 are also pivoted two bogies of the kind referred to by reference number 10 (FIG. 7 and 8). Both bogies 10 are similar, located one on each side of the chassis 5.

Each bogie 10 has two rollers 11 and 12 between which pivot pin 9 is located. A front nose portion 13 is adapted to thrust onto a stop member 14 of a tiltable connecting frame 8 when the bogie 10 is tilted in the direction of arrow 16 (FIG. 7 and 8). A rear nose portion 17 is provided on each tiltable bogie 10 for engaging a latching bracket 18 fixed to the corresponding lower longitudinal beam 19 of a container 20 of standard type.

The container 20 has under its floor two longitudinal beams 19 separated by the same distance as both bogies 10.

The vertical front wall 21 of the container 20 is provided with a loop member 22 adapted to receive a handling hook 23.

Said handling hook 23 is integral with the upper end of the the upper arm 24 of a L-shaped bracket 25. The latter has a lower arm 26 perpendicular to the upper arm 24.

The lower arm 26 of L-shaped bracket 25 is adapted to slide inside a tiltable sleeve 27. The latter is mounted longitudinally on the vehicle, with its rear end pivoted on the front portion of the tiltable connecting frame 8 by means of a pivot pin 28. Said tiltable connecting frame 8 is in turn pivoted to the rear part of the vehicle by means of pivot pin 9.

A double-acting hydraulic ram of known type (not shown on the drawings) is mounted longitudinally inside arm 26 and tiltable sleeve 27 in order to slide said arm 26 in one direction or the other, as indicated by double arrow 29 in FIG. 9).

The tiltable connecting frame 8 extends beyond pivot pin 28 and its front end has a nose member 30. The latter has an oblique upper face 31 and a longitudinal lower face 32 adapted to receive the lower end of a locking hook 33.

At its center portion, the locking hook 33 is pivoted to the tiltable sleeve 27 by means of a pivot pin 34. Above said pivot pin 34, the locking hook 33 has an upper lug 35 engaged through an opening 36 provided in the front portion of a longitudinal sliding plate 37. This plate 37 is guided inside the tiltable sleeve 27, and it is adapted to move rearwardly or forwardly (FIG. 9, double arrow 38). At its rear end, the sliding plate 37 is provided with a thrust bracket 39 protruding downwardly through the path of the rear end 40 of sliding lower arm 26.

A resilient return spring 41 is mounted between a fixation 42 of the tiltable sleeve 27 and a fixation 42 on the upper portion of the locking hook 33, above its pivot pin 34.

The operation is as follows:

In transport position, the container 20 is hooked by loop member 22 in handling hook 23 as shown in FIG. 1. Each lower longitudinal beam 19 of container 20 is carried by the two rollers 11 and 12 of the corresponding boggie 10.

Figure 2:
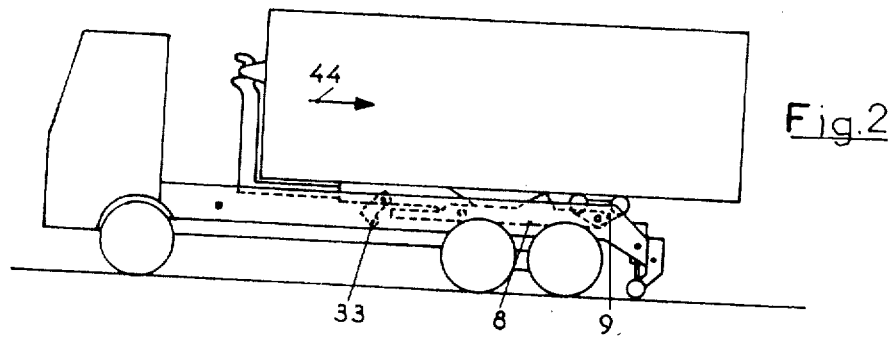

If the operator wishes to unload the container 20, i.e. to put it on the ground as illustrated in FIG. 5, he operates the hydraulic ram (not shown) for sliding lower arm 26 into tiltable sleeve 27. As a result thereof, the container 20 is moved rearwardly (FIG. 2, arrow 44), while the rear end 40 of said arm 26 pushes the sliding plate 37 rearwardly, thus tilting the hook 33 into its unlocked position (FIG. 10, arrow 45). From now on, the sleeve 27 is free to pivot about pin 28 relatively to the connecting frame 15.

Figure 3:
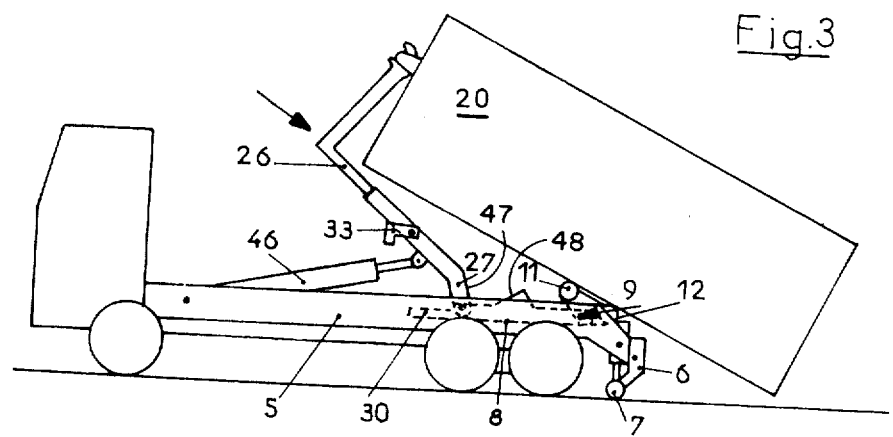

A hydraulic ram 46 being mounted in the known manner between the tiltable sleeve 27 and the chassis 5 of the truck, an elongation of said ram 46 pivots upwardly the sub-assembly 24, 26, 27 which rotates about pin 28 (FIG. 3). Said pivot pin 28 remains fixed until a thrust boss 47 on tiltable sleeve 27 comes into contact with another boss 48 on connecting frame 8 (FIG. 4). During this operation, the container 20 is lowered rearwardly and finally its rear end is lying on the ground (FIG. 4). Each longitudinal beam 19 of the container 20 is then rolling on the two rollers 11 and 12 of its bogie 10. It will be appreciated that, even at the most unfavourable position (FIG. 3), the bending strains in each longitudinal beam 19 are kept to a relatively low level, since said beam 19 is permanently carried by two rollers 11 and 12, which avoids any strain or stress concentration.

With further elongation of the ram 46, the operator tilts rearwardly all the sub-assembly 24, 26, 27, and 8 which is moving as a rigid unit about the pivot pin 9 (FIG. 5, arrow 49). At this final position, the U-shaped handling hook 23 has its opening directed rearwardly, and it is sufficient to drive the truck forwardly for leaving the container 20 on the ground.

This movement of the truck is allowed by the roller 7 of the stabilizer 6.

The loading operation of a container 20 from the position in FIG. 5 to that in FIG. 1 is performed by a reverse handling cycle. It will be appreciated that when the container 20 is carried horizontally on the rear portion of the chassis 5 (FIG. 2), it is sufficient to move it forwardly (FIG. 1, arrow 50) for engaging each latching bracket 18 of the container 20 under the rear nose portion 17 of the corresponding bogie 10. Since at that time said bogie 10 is stopped by abutment of front nose portion 13 and stop member 14, it appears that the container 20 is locked on the truck in the vertical direction, i.e. any vertical relative movement of the container 20 on the truck is made impossible.

If on the contrary, starting from the position illustrated in FIG. 1, the operator first energizes the hoisting ram 46, then sleeve 27 and connecting frame 8 keep in line with each other, locked together by means of locking hook 33. Then the whole unit 26, 27, 28 and 20 is tilted upwardly about rear pivot pin 9, as would be a rigid unit (FIG. 6). This operation permits to use the container 20 as a dumping bucket.

I claim:

1. Container-handling device for a self-loading vehicle, comprising:

an L-shaped bracket having an upper and a lower arm perpendicular to each other with the free end of said upper arm provided with a container handling hook, and one lower arm adapted to slide inside a tiltable sleeve;

a tiltable sleeve mounted longitudinally on the vehicle, with its rear end pivoted on the front end of a tiltable connecting frame;

a tiltable connecting frame the rear end of which is pivoted to the rear part of the vehicle chassis;

independent selectively operable hydraulic rams for sliding said L-shaped bracket in said tilting sleeve and for pivoting said tiltable sleeve with respect to the vehicle chassis;

a container having at its front end a loop member for receiving said handling hook, and at least two lower longitudinal beams under its floor wall, characterized in that the rear part of the vehicle chassis has at least two tiltable bogie each of them provided with at least two rollers so that each container longitudinal beam rolls on the rollers of its own bogie during loading and unloading operations, while on said tiltable sliding sleeve is pivoted a locking hook adapted to engage a nose member at the front end of said tiltable connecting frame in order to keep said tiltable sleeve in line with said tiltable connecting frame when said container is used as a dumping bucket on said vehicle, means for automatically disengaging said locking hook when said lower arm is beginning to slide into said tiltable sleeve for initiating an unloading operation.

2. Container-handling device according to claim 1, characterized in that each tiltable bogie has on both sides of its transverse pivot pin, respectively: a front nose portion adapted to engage a stop member of said tiltable connecting frame when a container is carried on the vehicle in loaded position; and a rear nose portion adapted to engage a latching bracket fixed to the corresponding container longitudinal beam.

3. Container-handling device according to claim 1, characterized in that said means for automatically disengaging the tiltable sleeve and frame locking hook comprise: an upper lug integral with said locking hook; a pivot pin for said locking hook, located between its upper lug and its lower hooking end; a longitudinally sliding plate guided inside the tiltable sleeve and having, near its front end, an opening engaged on said upper lug of said locking hook, and, at its rear end, a thrust bracket adapted to be engaged by the rear end of said lower arm of the L-shaped bracket so that when the latter is performing the last part of its contraction movement inside and tiltable sleeve, said sliding plate is moved rearwardly together with said hook upper lug, thus tilting said hook out of engagement with said connecting frame front nose.

4. Container-handling device according to claim 1, characterized in that a return spring is mounted between a fixation on said tiltable sleeve and a fixation on the upper portion of said locking hook above its pivot pin carried by said tiltable sleeve, so that the resilient action of said return spring urges said locking hook to its locking position of said nose member of the tiltable connecting frame, and also urges said sliding plate back to its forward position.

* * * * *